US006253274B1

(12) United States Patent
Boonie et al.

(10) Patent No.: US 6,253,274 B1
(45) Date of Patent: *Jun. 26, 2001

(54) APPARATUS FOR A HIGH PERFORMANCE LOCKING FACILITY

(75) Inventors: Mark A. Boonie, Hopewell Junction; Jeffrey M. Nick, Fishkill; Peter G. Sutton, Lagrangeville; Wendell W. Wilkinson, Hyde Park; Phil C. Yeh, Poughkeepsie, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/143,632

(22) Filed: Aug. 28, 1998

(51) Int. Cl.[7] .............................. G06F 12/00; G06F 13/00

(52) U.S. Cl. ................................. 710/200; 707/8

(58) Field of Search .................. 710/200; 709/213–216; 707/8–9

(56) References Cited

U.S. PATENT DOCUMENTS

| | | | |
|---|---|---|---|
| 4,320,455 | * 3/1982 | Woods et al. | 710/200 |
| 4,937,736 | * 6/1990 | Chang et al. | 711/152 |
| 5,161,227 | 11/1992 | Dias et al. | 709/104 |
| 5,202,990 | 4/1993 | Saikawa | 710/200 |
| 5,263,146 | 11/1993 | Mishima | 711/163 |
| 5,263,155 | * 11/1993 | Wang | 707/8 |
| 5,339,427 | 8/1994 | Elko et al. | 709/103 |
| 5,408,629 | 4/1995 | Tsuchiya et al. | 711/151 |
| 5,408,653 | 4/1995 | Josten et al. | 707/8 |
| 5,440,743 | * 8/1995 | Yokota et al. | 710/200 |
| 5,454,108 | * 9/1995 | Devarakonda et al. | 709/104 |
| 5,596,754 | 1/1997 | Lomet | 710/200 |
| 5,613,139 | * 3/1997 | Brady | 710/200 |
| 5,623,671 | 4/1997 | Ando et al. | 710/200 |
| 5,682,537 | 10/1997 | Davies et al. | 710/200 |
| 5,729,749 | * 3/1998 | Ito | 710/200 |
| 5,737,600 | 4/1998 | Geiner et al. | 710/200 |
| 5,794,241 | * 8/1998 | Loaiza | 707/8 |
| 5,895,492 | * 4/1999 | Greenspan et al. | 711/147 |
| 5,909,695 | * 6/1999 | Wong et al. | 711/133 |
| 5,913,213 | * 6/1999 | Wikstrom et al. | 707/8 |
| 5,946,711 | * 8/1999 | Donnelly | 711/152 |

FOREIGN PATENT DOCUMENTS 5108452  4/1993  (JP) ................................ G06F/12/00

OTHER PUBLICATIONS

Gawlick, D., "Lock Processing in a Shared Data Base Environment," IBM Technical Disclosure Bulletin, vol. 25, No. 10, 3/83, pp. 4980–4985.

"Fine Granularity Locking to Support High Data Availability in a Client/Server Database Management System," IBM Technical Disclosure Bulletin, vol. 38, No. 02, 02/95, pp. 143–145.

Stevens, R.W., "Unix Network Programming," Prentice Hall PTR, 1990, pp. 447–448.

* cited by examiner

Primary Examiner—Sumati Lefkowitz
(74) Attorney, Agent, or Firm—Andrew J. Wojnicki, Jr.; Lily Neff

(57) ABSTRACT

In a network computing environment having a plurality of central processing units, a high performance locking facility coupled to said plurality of central processing units comprising: a processing means for processing multiple requests for locking operations simultaneously and a lock table for creating entries including lock names and lock states. A high-speed searching mechanism for searching any particular lock entry in the table is also provided, as well as means for altering and modifying said table accordingly depending upon any lock status that is being processed. Finally a response and status generator is provided for providing an appropriate response and status of any lock state to other requestors requesting a particular lock.

19 Claims, 2 Drawing Sheets

| BYTES | REQUEST OPERAND | | ACRONYM |
|---|---|---|---|
| 0–4 | RESERVED (ZEROS) | | |
| 5 | BIT DESCRIPTION 0–6 RESERVED (ZEROS) 7 LOCK STATE | | LS |
| 6 | RESERVED (ZEROS) | | |
| 7 | FIRST WAITER ID | | FWI |
| 8–15 | LOCK-HOLDER LIST | | LHL |
| 16–23 | EXCLUSIVE-REQUESTOR LIST | | ERL |
| 24–31 | SHARED-REQUESTOR LIST | | SRL |
| 32–63 | RESERVED (ZEROS) | | |

| BYTES | REQUEST OPERAND | ACRONYM |
|---|---|---|
| 0-4 | RESERVED (ZEROS) | |
| 5 | BIT  DESCRIPTION<br>0-6  RESERVED (ZEROS)<br>7    LOCK STATE | LS |
| 6 | RESERVED (ZEROS) | |
| 7 | FIRST WAITER ID | FWI |
| 8-15 | LOCK-HOLDER LIST | LHL |
| 16-23 | EXCLUSIVE-REQUESTOR LIST | ERL |
| 24-31 | SHARED-REQUESTOR LIST | SRL |
| 32-63 | RESERVED (ZEROS) | |

APPARATUS FOR A HIGH PERFORMANCE LOCKING FACILITY

FIELD OF INVENTION

The present invention relates to the control access to shared resources in computer systems and more particularly to a method for performing high performance locking facility in a loosely coupled environment.

BACKGROUND OF THE INVENTION

In both a tightly coupled and a loosely coupled environment, messages are needed to orchestrate the execution of each transaction. This is particularly true with partitioned systems where all updates are done by the single server for a partition, lock management for resources of the partition is done at this server and locks are held by transactions running at the server.

One method of synchronizing tasks in a data sharing environment is known as locking. By this method, a task first obtains access to a data structure known as a lock and then indicates the type of access that is desired in order to either read or modify data in the database that is protected by the lock. The task then has access to the protected data with the specified type of access. Other tasks are prevented from accessing the protected data until a lock is obtained.

Currently, many systems use a Multipath Lock Facility or MPLF which is a kind of input/output device. MPLF serializes accesses to locks resided on the same device. The performance and is also limited by the input/output latency. To alleviate this performance problem in some installations, locks are distributed among multiple MPLFs so that concurrent accesses can be achieved. However, as the lock request rate increases, the number of MPLFs required to maintain a reasonable system throughput also increases and the cost becomes prohibitive. As a consequence a better locking facility is needed that can address these cost and performance issues. The facility provides a means to construct an adjunct lock table for, in one embodiment up to 64 users, based on the list structure. There is one list entry for each lock that is currently being held by some users. List entries are named so that the lock name is stored in the associated list entry name object. Information about lock state, pending lock requests, lock holders, and first requestor in the waiting queue of a particular lock is maintained in the list lock entry.

This application is being filed at the same time as related applications Ser. Nos.: 09/143,328; 09/143,329; and 09/141,544.

SUMMARY OF THE INVENTION

In a network computing environment having a plurality of central processing units, a high performance locking facility coupled to said plurality of central processing units comprising: a processing means for processing multiple requests for locking operations simultaneously and a lock table for creating entries including lock names and lock states. A high-speed searching mechanism for searching any particular lock entry in the table is also provided, as well as means for altering and modifying said table accordingly depending upon any lock status that is being processed. Finally a response and status generator is provided for providing an appropriate response and status of any lock state to other requestors requesting a particular lock.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

Figure 1:
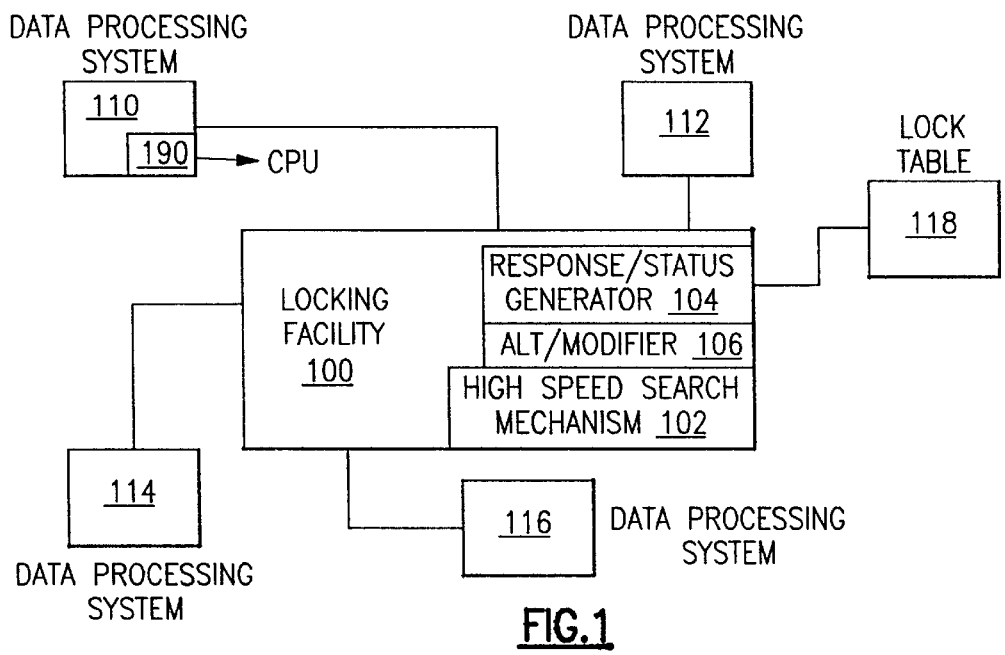
FIG. 1 is a block diagram showing a system environment such as the one used in one embodiment of the present invention.

FIG. 1 shows one embodiment of the present invention where a locking facility 100 is in processing communication with a number of data processing systems shown at 110, 112, 114 and 116, each having one or more Central Processor Units or CPUs shown at 190, accessing the locking facility. The locking facility can provide locks to a variety of different components that require it ranging from data to programs to applications. While the existing systems do not provide for processing of multiple requests, the present invention provides for receiving and/or processing of multiple requests for locking operations (from the CPUs) simultaneously. A lock table (not shown) will be provided to dynamically create, alter and update entries reflecting lock status. When a request is received, the lock table will be searched using a high-speed searching means. If a lock entry is located, the appropriate operation will be performed, otherwise an entry will be created or an appropriate/response will be sent.

Figure 2:
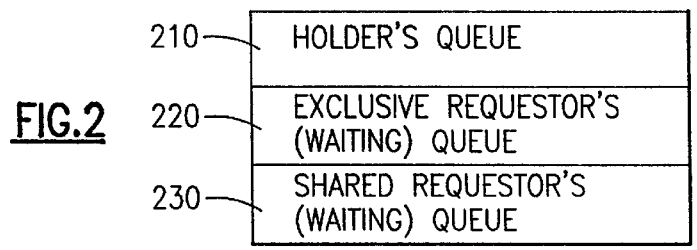
FIG. 2 is a block diagram depicting different Queues as per one embodiment of the present invention.

FIG. 2 is a diagram illustrating 3 queues provided in each lock table entry as depicted by one embodiment of the present invention. Holders Queue is shown at 210, Exclusive Requestor's Queue at 220 and Shared Requestor's at 230. When a System A is holding a lock and System B is trying to access it, System B has to wait until System A is finished is System A has exclusive access or if System B wants exclusive access. If System A has exclusive access, then depending on whether exclusive or shared access is needed, System B is then placed in either Exclusive or Shared Requestor's queue until the lock become available. If more than one requestor is waiting in the queues, a number of techniques can be used to establish priority in the queue or even access it in a round robin configuration.

The Holders Queue is used to keep track of any and all requestors that hold the lock. In one preferred embodiment, each bit in the Holder's queue represents a user and so when the bit is turned on, that user holds the lock.

EXAMPLE 1

Holder's Queue:

| | 0 | 0 | 0 | 1 | 0 | 0 | 0 | |
|---|---|---|---|---|---|---|---|---|
| | 1 | 2 | 3 | 4 | 5 | 6 | 7 | |

In the above example, user 4 holds the lock.

The Exclusive Requestor's Queue indicates which user has requested and is waiting for exclusive rights to the lock.

EXAMPLE 2

Exclusive Requestor's Queue:

| | 1 | 0 | 0 | 0 | 1 | 0 | 0 | |
|---|---|---|---|---|---|---|---|---|
| | 1 | 2 | 3 | 4 | 5 | 6 | 7 | |

In the above example, users 1 and 5 are waiting for the lock exclusively. In one embodiment of the present invention, once the exclusive lock is released, the waiting queue (both Exclusive and shared Requestor's Queue) is processed in a round-robin fashion so as to be blocked indefinitely. In another embodiment, it is possible to provide more bits so as to determine waiting or task priority.

A similar situation exists for the Shared Requestor's Queue. Normally when the lock is shared, every requestor can access the data concurrently. But it is not difficult to imagine situations where one user is actually requesting an exclusive lock. For example if user 3 and 7 are requesting a lock with shared access while user 2 is holding the lock exclusively, then users 3 and 5 must wait in the Shared Requestor's Queue as shown in example 3.

EXAMPLE 3

Waiting Shared Queue:

| | 0 | 0 | 1 | 0 | 1 | 0 | 0 | |
|---|---|---|---|---|---|---|---|---|
| | 1 | 2 | 3 | 4 | 5 | 6 | 7 | |

This queuing technique of holding the requestor in the holding queue has the added benefit of freeing up I/O links which eventually also lead to performance improvements. Without queuing, each rejected request must be re-submitted which leads to an increased total request rate. In the existing systems, for each lock operation there had to be a separated input/output request. The present invention proposes a high-speed locking facility, where the execution of the locking commands can be synchronous with respect to the requesting CPU to provide fast response time and to simplify the task management. In addition, multiple lock requests can be packaged into one command so that the effective overhead for each lock request becomes negligible. Also different locking functions, like lock request and lock release, can be packaged together and are executed in sequence. This provides for an efficient distributed locking management mechanism at each system. Furthermore, multiple locking commands can be processed by the locking facility simultaneously. A mechanism of notifying lock holders for lock-contention events and lock waiters for lock-granted events is also provided.

As a consequence, under the workings of the present invention, locking requests can be grouped in a batch and submitted in a bundled up configuration, perhaps hundred at a time. Also it is possible to have multiple links work together simultaneously. Furthermore, the present invention provides for a synchronous, rather than asynchronous, locking operation without any interruptions or overhead.

Figure 3:
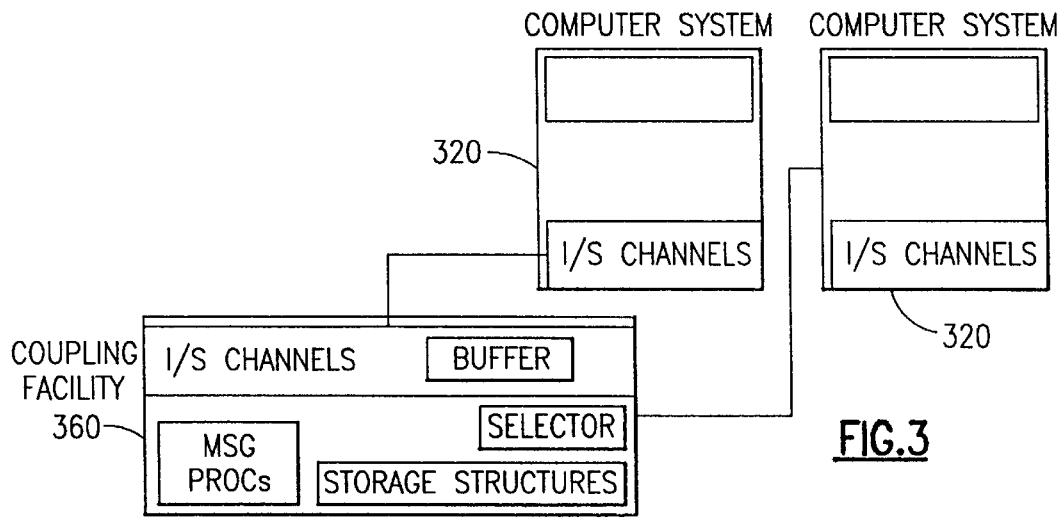
FIG. 3 depicts a block diagram showing a coupling facility environment.

FIG. 3 depicts a block diagram of a coupling facility environment including multiple computer systems 320, which are in processing communication with a coupling facility 360. The coupling facility can include a plurality of Intersystem (I/S) channels and one or more buffers located within the intersystem channels for storing data received from intersystem channels. Even though, one coupling facility is shown in FIG. 3, it will be understood that multiple coupling facilities can be used in conjunction with one another. The coupling facility includes storage accessible by the computer systems and multiple operating systems.

One example of a storage structure located in the coupling facility is a list structure. List structure includes list structure controls a very primitive lock table and list-entry controls. List structure controls contain attributes of the structure and are initialized when the list structure is created. It can include maximum data list entry size and list structure type, for example.

List command provides a means for conditionally creating, reading, replacing, moving or deleting one entry in a list. Examples of this are list-number comparison, version-number comparison and global-lock manager. The position of a list entry is determined when it is created and may be changed when any entry in the list is created, deleted, or moved. U.S. Pat. No. 5,737,600 assigned to International Business Machines (IBM) Corp. of Armonk, can be referenced for more information about this.

Figures 4, 5:
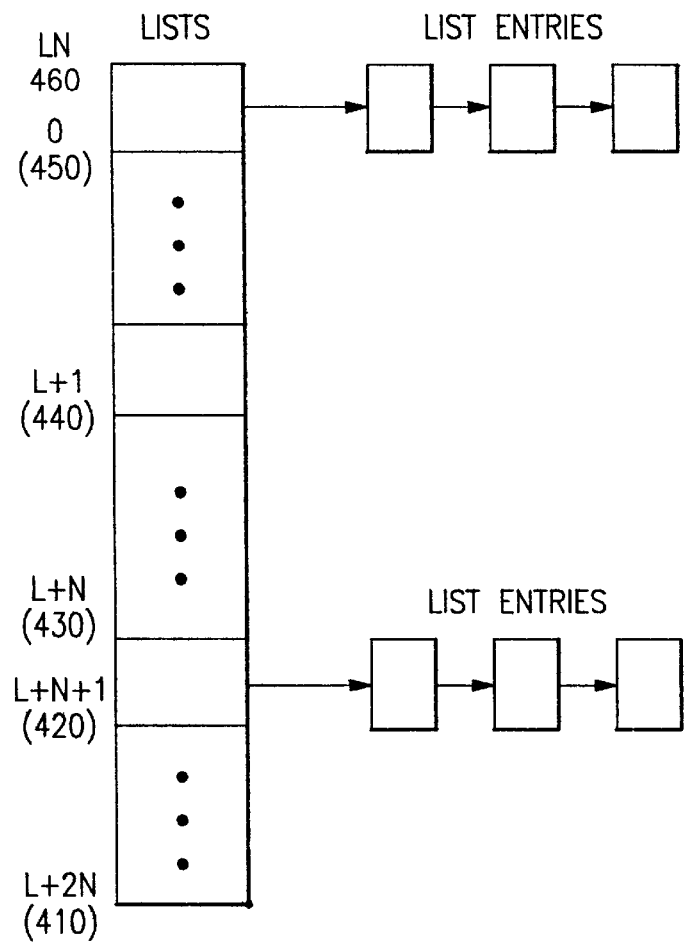
FIG. 4 shows a lock table using the list structure constructs.
FIG. 5 shows the format of adjunct-data area of an adjunct-lock entry.

The workings of the present invention is preferably designed based on existing list structure of the coupling facility, but it is understood that the present invention can be implemented using other data structures . FIG. 4 shows a lock table using the list structure constructs. A list structure is used primarily to record data and can have a number of elements called list entries as shown in FIG. 4, 410 to 460 respectively. Each element is are used under the present invention for each lock being held.

Under the embodiment shown in FIG. 4, a list set is created with L+2N+1 lists. Each list entry contains only list-entry controls and adjunct-data area. In one embodiment up to 64 users can be attached to the lock table. The first L+1 lists in the list structure are used to maintain lock information. Lists L+1 to L+N, one for each user, are used to facilitate generation of lock contention event notifications for the associated user. Lists L+N+1 to L+2N, again one for each user are used for generating lock-granted event notifications. Each user registers interest in the state transitions of the associated lists. Whenever a lock contention or lock granted event occurs, an entry in the appropriate list is created by the requesting user and a list notification may be generated and sent to all registered users. A lock contention event occurs when a lock request cannot be granted and the requester is placed in a waiting queue. A lock granted event occurs when the requested lock is granted to a user in a waiting queue. Note that the lock contention or lock-granted notification could be performed by the locking facility automatically when the event occurs. In that case, lists L+1 to L+2N are not needed. The embodiment uses list notification to simulate these notifications for saving cost.

The list set uses a name for locating list entries. There is one list entry for each lock that is currently being held by some systems. The lock name is stored in the associated list-entry name object in the list entry controls. When the lock name is eight bytes long, as in one embodiment of the present invention, and list entry name is 16 bytes long, an eight-byte value to the right of its lock name is padded to form a 16 byte list-entry name. When an entry in the first L+1 lists is located using the name, the padding value is zero. When a list entry is to be written for signaling a lock granted or lock contention event, the padding value consists of one byte user ID of the requestor and seven bytes of the low order part of the Time Of Day (TOD) clock value. This ensures that multiple list entries with the same lock name have unique list entry names.

The present invention can use the existing message-path commands to establish connections to the coupling facility and uses the existing list structure commands to create the list structure for locking. All other existing commands are available for retry, measurement or management.

Adjunct Locking Facility

This section summarizes coupling facility's command architecture extensions that support the adjunct locking facility used such as the one used by International Business Machines Transaction Processing Facility (hereinafter TPF) operating system.

A new one-bit object, adjunct-lock-entry indicator is used in list entry controls to define a new type of list entry. When the value of the object is one, the entry is an adjunct lock entry, and the associated adjunct-data area contains lock information and is formatted. When the value is zero, the entry is a list entry and the associated adjunct data area if it exists is unformatted.

Adjunct lock entries can be created only by the lock request process, but can be operated on by existing commands. However, the new commands proposed here operate only on named list entries with adjunct-lock entries.

The adjunct locking facility also consists of the perform adjunct lock operations (PALOS) read-adjunct-lock-information (RALI), withdraw-adjunct-lock user (WALU) and perform-adjunct-lock-operation (PALO) list structure commands. They are collectively called adjunct locking commands.

The facility provides a means to construct an adjunct lock table, for in one embodiment up to 64 users, based on the list structure. There is one list entry for each lock that is currently being held by some users. List entries are named so that the lock name is stored in the associated list entry name object. Information about lock state, pending lock requests, lock holders, and first requester in the waiting queue of a particular lock is maintained in the adjunct-lock entry.

A. Format of Adjunct Data Area

FIG. 5 shows the format of adjunct-data area of an adjunct-lock entry.

Lock State (LS)—is a common one bit value that specifies the lock state. When the value is zero, the associated lock is being held as shared. When the value is one, the lock is being held as exclusive.

First Waiter ID (FWI)—is a one byte value that contains the user ID of the first requester in the waiter queue (that is both ERL and SRL). This is used to provide a round-robin scheme of granting the lock to requestors in the waiter queue.

Lock Holder List (LHL)—is an eight byte value that contains the lock holder list. Each bit in this field is assigned to a user; the value of the user ID minus one specifies the bit position. When a bit is one, the corresponding user is holding the lock. A lock may be held by more than one user only if it is shared.

Exclusive-Requestor List (ERL)—is an eight byte value that contains the exclusive-requestor list. Each bit in this field is assigned to a user; the value of the user ID minus one specifies the bit position. When a bit is one, the corresponding user is waiting for the lock with an exclusive request.

Shared-Requestor List (SRL)—is an eight byte value that contains the shared-requestor list. Each bit in this field is assigned to a user; the value of the user ID minus one specifies the bit position. When a bit is one, the corresponding user is waiting for the lock with a shared request.

B. Locking Operations

This section describes the lock-request process, lock release process and lock withdrawal process. These processes may be invoked by executing the PALO, PALOS and WALU commands.

1) Lock Request Process:

1. When the requested lock is not currently being held, (that is, the named entry does not exist,) a list entry with the specified name and an adjunct-lock entry is created at the target position in the specified list. If, during the list entry creation, a list full or list set full condition exists, then an appropriate reply code and response code are stored, and command execution is completed. If the named entry is created successfully, then the lock is granted to the requester as follows: the lock state field is set to the requested lock type (exclusive or shared), the FWI field is set to zero, the bit for the requestor in LHL is set to one, both ERL and SRL are set to zeros and an appropriate reply code is stored.

2. When the located entry is not an adjunct-lock entry, then an appropriate reply code and response code are stored, and command execution is completed.

3. When the requestor is already a lock holder or waiter of the specified lock, then an appropriate reply code and response code are stored, and command execution is completed.

4. When the requested lock is currently being held, and the requestor is not in any of LHL, ERL, SRL and if a. the lock is being held as shared and:

i) FWI is zero and the requested lock type is shared, then the lock is granted to the requestor by setting the bit for the requester in LHL to one. An appropriate reply code is stored.

ii) FWI is non-zero, then the requestor is placed in either ERL or SRL, depending on the requested lock type. An appropriate reply code is stored.

iii) FWI is zero and the requested lock type is exclusive, then the requestor is placed in ERL and FWI is set to the requestor ID. An appropriate reply code is stored.

b. the lock is being held as exclusive, then the requestor is placed either in ERL or SRL, depending on the requested lock type. If the requester is the only one in the ERL and SRL, then FWI is set to the requester ID and an appropriate reply code is stored. Otherwise, a different reply code is stored.

2) Lock Release Process

1. When the specified lock does not exist, an appropriate reply code and response code are stored and command execution is completed.

2. When the located entry is not an adjunct-lock entry, then an appropriate reply code and response code are stored, and command execution is completed.

3. When the specified lock exists, but the lock state does not match the specified lock-type operand, an appropriate reply code and response code are stored, and command execution is completed.

4. When the requester does not hold the specified lock, an appropriate reply code and response code are stored and command execution is completed.

5. When the requester holds the lock with the specified lock type and if a. the requester is the only holder of the lock and there is no waiter (that is both ERL and SRL are zeros), the entry associated with the adjunct-lock entry is deleted and an appropriate reply code is stored.

b. there are other holders (that is the lock is being held as shared) then the requestor is removed from LHL and an appropriate reply code is stored.

c. the requestor is the only holder of the lock and there is at least one waiter, then the requestor is removed from LHL, and i) if the requested lock type of the next requestor pointed to by FWI is exclusive, then the lock is granted to the next requestor by removing its ID from the ERL and adding it to LHL, the lock state is set to exclusive, and FWI is set to the next waiter in ERL and SRL in an ascending-order, round-robin fashion. If there is no more waiter, FWI is set to zero and an appropriate reply code is stored. If there is still a waiter, a different reply code is stored.

ii) if the requested lock type of the next requestor pointed to by FWI is shared, then the lock is granted to the next requestor by removing its ID from SRL to LHL, the lock state set to shared, and FWI is set to the next requestor in ERL and SRL in an ascending-order, round-robin fashion; a non-blocking scheme that ensures no requester will wait indefinitely. Step 5c2 is then repeated until there are no more waiters or the next requestor is an exclusive requestor. In the former case, FWI is set to zero and an appropriate reply code is stored; in latter case FWI is set to the exclusive requestor and a different reply code is stored.

3) Request-Withdrawal Process

The process is used to withdraw the specified user from a waiter queue (either ERL or SRL) or the holder queue (LHL) of the designated lock.

1. When the specified lock does not exist, an appropriate reply code and response code are stored, and command execution is completed.

2. When the located entry is not an adjunct-lock entry, then an appropriate reply code and response code are stored, and command execution is completed.

3. When the specified lock exists, if the requestor does not hold or wait for the lock, an appropriate reply code and response code are stored, and command execution is completed.

4. If the requester is found in a waiter queue of the specified lock, and if a. the requestor is the only waiter, then the requestor is removed from the queue, FWI is set to zero, and an appropriate reply code is set.

b. there are other waiters, then the requestor is removed from the queue and an appropriate reply code is set. If FWI contains the requester ID, it is set to the next waiter in ERL and SRL in an ascending-order, round-robin fashion; otherwise, FWI remains unchanged.

5. If the requestor is found in the holder queue, then the steps 5a to 5c of the lock-release process are performed.

Conclusion of Locking Operation

A reply code is stored for each locking operation to indicate the result of execution. Also stored for each locking operation is the contents of the LHL object at the completion of the locking operation. This LHL value allows the requestor to initiate event notifications.

In one embodiment of the present invention a hashing algorithm is used. A hash table is defined as a table of information that is accessed by way of a shortened search key (the hash value) as is known by those skilled in the art. Using a hashing minimizes average search time.

C. Adjunct-Locking Commands

Perform Adjunct Lock Operations (PALOS)

A number of locking operations are requested through this command. Each request is performed in the specified order, and a reply code and the contents of the LHL object are returned for each request processed. Processing continues until the end of the request list is reached, or an abnormal condition happens causing command execution to complete.

Read Adjunct Lock Information (RALI)

Information about the list-entry controls and adjunct-list entry is read for entries that the specified user is a lock holder or a lock requestor in the waiter queue. The list entries in the set are processed starting at a specified entry until the last entry is processed or an abnormal condition happens causing command execution to complete.

Withdraw Adjunct Lock User (WALU)

The specified user is withdrawn from the waiter queue of all locks and is also withdrawn from the lock holder list of all locks (i.e. all held locks are released). For each entry the user's request is withdrawn, information about the lock-holder list, list entry name, and reply code is stored. The list entries in the set are processed starting at a specified entry until the last entry is processed or an abnormal condition happens causing command execution to complete.

Perform Adjunct Lock Operation (PALO)

This command is similar to the PALOS command, except that only one locking operation can be requested by the command.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. In a network computing environment having a plurality of central processing units, a high performance locking facility coupled to said plurality of central processing units comprising:

processing means for processing multiple requests for locking operations simultaneously without requiring separate input and/or output requests;

a locking command mechanism able to execute synchronous commands relating to one or more of said central processing units;

said mechanism allowing for multiple lock operations to be packaged into one command for execution;

said lock operations packaged into one command including a mixture of lock, unlock, or other lock management operations;

said lock operations packaged into one command being able to be processed independently of other lock operations packaged into said one command, thereby enabling said locking facility to process a subset of said lock operations packaged into one command;

a lock table for creating entries including lock names and lock states;

a high-speed searching mechanism for searching any particular lock entry in said table;

an altering and modifying element for altering and modifying said table accordingly depending upon any lock status that is being processed;

response and status generator for providing an appropriate response and status of any lock state to other requestors requesting a particular lock.

2. The apparatus of claim 1, wherein a holder queue and a waiting queue is provided for each lock further comprising means for creating new entries if no match is found in said table and a request is outstanding; and a notification mechanism notifying lock holders for lock contention events and lock waiters for lock granted events is provided.

3. The apparatus of claim 2, wherein said waiting queue comprises of a shared requestor queue and an exclusive requestor queue.

4. The apparatus of claim 3, wherein a pointer specifying first waiting requestor in each queue is provided.

5. The apparatus of claim 2, wherein said waiting queue is used for keeping track of any waiting requestors trying to establish access to said locking facility while a first requestor has exclusive access to said locking facility.

6. The apparatus of claim 4, wherein said waiting requestor is placed in an exclusive requestor queue if said waiting requestor is requesting exclusive access to said locking facility.

7. The apparatus of claim 4, wherein said waiting requestor is placed in a shared requester queue if said waiting requestor is not requesting exclusive access to said locking facility.

8. The apparatus of claim 2, wherein said a non-blocking means is provided to serve requestors in said waiting queues.

9. The apparatus of claim 4, wherein requests of said requestors in said waiting queues is processed based on waiting priority.

10. The apparatus of claim 4, wherein requests of said requestors in said waiting queues is processed in an ascending order.

11. The apparatus of claim 4, wherein requests of said requestors in said waiting queues is processed in a round-robin fashion.

12. The apparatus of claim 2, wherein said computing environment includes a coupling facility.

13. The apparatus of claim 12, wherein said entries in said lock table is constructed using list structure pertaining to said coupling facility.

14. The apparatus of claim 13, wherein a list entry is created for each lock that is being held.

15. The apparatus of claim 14, wherein a lock name is stored in a list-entry-name object.

16. The apparatus of claim 15, wherein said list entry contains lock state indicating whether said lock is shared or exclusive.

17. The apparatus of claim 2, wherein a hashing algorithm is used.

18. The apparatus of claim 16, wherein a list notification is used to simulate a lock-granted notification.

19. In a network computing environment having a plurality of central processing units, a high performance locking facility coupled to said plurality of central processing units comprising:

receiving means for receiving multiple requests for locking operations simultaneously without requiring separate input and/or output requests;

a locking command mechanism able to execute synchronous commands relating to one or more of said central processing units;

said mechanism allowing for multiple lock operations to be packaged into one command for execution;

said lock operations packaged into one command including a mixture of lock, unlock, or other lock management operations;

said lock operations packaged into one command being able to be processed independently of other lock operations packaged into said one command, thereby enabling said locking facility to process a subset of said lock operations packaged into one command;

a lock table for creating entries including lock names and lock states;

a high-speed searching mechanism for searching any particular lock entry in said table;

an altering and modifying element for altering and modifying said table accordingly depending upon any lock status that is being processed;

response and status generator for providing an appropriate response and status of any lock state to other requestors requesting a particular lock.

* * * * *

UNITED STATES PATENT AND TRADEMARK OFFICE
CERTIFICATE OF CORRECTION

PATENT NO.    : 6,253,274 B1                                              Page 1 of 1
DATED         : June 26, 2001
INVENTOR(S)   : Boonie et al.

It is certified that error appears in the above-identified patent and that said Letters Patent is hereby corrected as shown below:

<u>Title page,</u>
Item [57], ABSTRACT reads "In a network computing environment having a plurality of central processing units, a high performance locking facility coupled to said plurality of central processing units comprising: a processing means for processing multiple request for locking operations simultaneously and a lock table for creating entries including lock names and lock states. A high-speed searching mechanism for searching any particular lock entry in the table is also provided, as well as means for altering and modifying said table accordingly depending upon any lock status that is being processed. Finally a response and status generator is provided for providing a appropriate response and status of any lock state to other requesting a particular lock."

should read

-- A device for controlling access to shared resources by assigning and releasing locks, in a network computing environment having a plurality of central processing units. The device, a high performance locking facility, is coupled to the plurality of central processing units. The high performance locking facility includes: an element to simultaneously process multiple requests for lock operations, a lock table, a high-speed searching mechanism, and a response and status generator. The lock table contains entries including lock names and lock states, and is modified accordingly depending upon any lock status that is being processed. The high-speed searching mechanism searches the lock table for a particular lock entry. The response and status generator provides the appropriate response and status of any lock state to other central processing units requesting a particular lock --.

Signed and Sealed this

Eighth Day of October, 2002

*Attest:*

*Attesting Officer*

JAMES E. ROGAN
*Director of the United States Patent and Trademark Office*